US012554787B2

(12) United States Patent
Duncan (10) Patent No.: US 12,554,787 B2
(45) Date of Patent: Feb. 17, 2026

(54) SYSTEM AND METHOD FOR FULFILLING CASUAL EMPLOYMENT REQUIREMENTS

(71) Applicant: Caitlin Duncan, Victoria (AU)

(72) Inventor: Caitlin Duncan, Victoria (AU)

( * ) Notice: Subject to any disclaimer, the term of this patent is extended or adjusted under 35 U.S.C. 154(b) by 0 days.

(21) Appl. No.: 18/723,390

(22) PCT Filed: Dec. 22, 2022

(86) PCT No.: PCT/AU2022/051563
§ 371 (c)(1),
(2) Date: Jun. 21, 2024

(87) PCT Pub. No.: WO2023/115137
PCT Pub. Date: Jun. 29, 2023

(65) Prior Publication Data
US 2025/0068686 A1 Feb. 27, 2025

(30) Foreign Application Priority Data
Dec. 22, 2021 (AU) ................................ 2021904214

(51) Int. Cl.
*G06F 16/9537* (2019.01)
*G06F 16/9535* (2019.01)
*G06Q 10/1053* (2023.01)
(52) U.S. Cl.
CPC ...... *G06F 16/9537* (2019.01); *G06F 16/9535* (2019.01); *G06Q 10/1053* (2013.01)
(58) Field of Classification Search
CPC ............ G06F 16/9537; G06F 16/9535; G06Q 10/1053
See application file for complete search history.

(56) References Cited

U.S. PATENT DOCUMENTS

2002/0072946 A1* 6/2002 Richardson ............ G06Q 10/06
705/7.14
2010/0162091 A1* 6/2010 Yepez ................. G06F 16/9537
715/201

(Continued)

OTHER PUBLICATIONS

Mar. 17, 2023 International Search Report issued in International Patent Application No. PCT/AU2022/051563.

(Continued)

*Primary Examiner* — Jensen Hu
(74) *Attorney, Agent, or Firm* — Williams Mullen; R. Brian Drozd (57) ABSTRACT

A method for fulfilling casual employment requirements includes receiving, from user(s) seeking casual employment opportunities, a location, qualification(s) and availability of each user, receiving, from entities seeking to fulfill casual employment requirements, a location, minimum qualification(s) and a time period for which casual employment services are required in order to fulfill each requirement, receiving, from a particular user, a request to search for casual employment opportunities, generating search results representing a selected casual employment requirements subset corresponding to a location pertaining to the particular user, the minimum qualification(s) required to fulfill each selected requirement being satisfied by the qualification(s) of the particular user, and the period of time for which services are required satisfied by the availability of the particular user, causing a device associated with the particular user to display an interface including a listing of the selected subset of casual employment requirements presented as available casual employment opportunities.

18 Claims, 7 Drawing Sheets

(56) References Cited

U.S. PATENT DOCUMENTS

| | | | |
|---|---|---|---|
| 2015/0186910 A1* | 7/2015 | Cruickshank | G06Q 30/0205 |
| | | | 705/7.34 |
| 2015/0248646 A1 | 9/2015 | Avats | |
| 2017/0300861 A9 | 10/2017 | Avats | |
| 2019/0102743 A1* | 4/2019 | Cirrincione | G06F 16/29 |
| 2019/0188648 A1* | 6/2019 | Ruiz | G06Q 10/1053 |
| 2020/0005217 A1* | 1/2020 | Sharma | G06N 20/20 |
| 2020/0050704 A1* | 2/2020 | Gladney | G06F 40/174 |
| 2020/0349521 A1* | 11/2020 | Clark | G06Q 10/1053 |
| 2020/0394539 A1 | 12/2020 | Sethre et al. | |
| 2021/0150447 A1 | 5/2021 | Badra | |

OTHER PUBLICATIONS

Mar. 17, 2023 Written Opinion issued in International Patent Application No. PCT/AU2022/051563.

\* cited by examiner

SYSTEM AND METHOD FOR FULFILLING CASUAL EMPLOYMENT REQUIREMENTS

FIELD OF THE INVENTION

The present invention relates to a system and method for fulfilling casual employment requirements. In particular, the present invention seeks to assist individuals and organisations seeking to fulfill their casual employment requirements to locate and engage available and suitably qualified casual employees, and similarly, to assist individuals seeking casual employment opportunities to locate and apply casual employment opportunities for which they satisfy the requirements of the organisation.

BACKGROUND OF THE INVENTION

Casual employment, as compared with full or part-time employment, requires the acceptance, by a casual employee, of a job offer from an employer on the understanding that there is no commitment to ongoing work. For example, an employer may require the services of an employee on a "shift" basis for an agreed time period (e.g. hours, days, weeks, etc).

A problem that exists in many workplaces is the need for casual employment requirements to be fulfilled quickly and often at short notice. For example, an existing part-time or full-time employee may be absent on any particular day, due to illness or other reason. The employer is often only aware of the employee's unavailability on the morning of that workday, or at best, the evening prior. This often leaves insufficient time for the employer to make arrangements to engage another available casual employee to work the shift, or hours, of the absent staff member.

Staff absenteeism, and the inability to replace staff at short notice generally results in a significant loss of productivity in an organisation, and ultimately, has a significant impact upon the organisation's profitability. This problem can be exacerbated when employee's call in absent on any one day, or when other staff members within an organisation are reliant upon the absent staff member(s) for training purposes or to fulfil their own duties for the day. In other words, reduced productivity may be experienced across an entire team as a result of a single or a small number of staff members being absent on any given day.

Time is not the only impediment to locating replacement casual employees. In some instances, casual employees are available and can be located by an employer in time, but the casual employee may not have the necessary skills or experience to replace the absent staff member. This can result in additional problems since the cost of the replacement casual employee is often greater than the rate paid to non-casual staff, and the employee may be unable to fulfill the particular requirement (e.g. to perform the same daily duties as the absent staff member, to train other staff members, etc). Accordingly, using conventional methods to locate and engage a casual work force can often result in less productivity and increased cost as compared with replacing the absent staff member.

Similar problems exist from the perspective of individuals seeking casual employment opportunities. Whilst organisations often offer full-time and part-time roles through various channels, including employment websites and the like, available casual opportunities are often not listed since these roles are typically required to be filled at very short notice. In some instances, employers don't bother searching for a replacement in view of the time and effort required and the probability that the absent employee will likely return to work the next day or in the near future.

There is also a wastage of computing and memory resources during the process of searching for and engaging a replacement staff member at short notice, since the employer needs to spend considerable time utilising their device (e.g. smart phone or tablet) to effect the multiple searches and phone calls. This has the effect of consuming substantially greater data communications bandwidth and hence causes significant additional computer and network resource usage. Inefficient use of the available bandwidth of data communications networks is clearly undesirable since slow and/or unreliable data communications are frustrating (and expensive) for users. This problem is exacerbated during times of high network traffic which consume available bandwidth.

Accordingly, there is a need for individuals and organisations that employ staff to be able to fulfil their casual employment requirements at short notice, and to further ensure that the replacement employee is suitably qualified to fulfill the requirements. There is equally a need for casual employment seekers to locate available opportunities suitably matched to their qualifications, experience and availability. There is a further need to address these problems in a manner that preserves computer and network resource usage.

The computer-implemented system and method of the present invention seeks to address the above identified problems, or at least provide an alternative solution to same.

The reference to any prior art in this specification is not, and should not be taken as, an acknowledgement or any suggestion, that the prior art forms part of the common general knowledge.

SUMMARY OF THE INVENTION

In one aspect, the present invention provides a computer-implemented method for fulfilling casual employment requirements, the method including receiving, from data communication device(s) associated with one or more users seeking casual employment opportunities, details relating to the one or more users including a geographical location pertaining to each user, qualification(s) associated with each user, and availability associated with each user, receiving, from data communication devices associated with a plurality of individuals or organisations seeking to fulfill casual employment requirements, details relating to the casual employment requirements including, a geographical location pertaining to each requirement, minimum qualification (s) required to fulfill each requirement, and a period of time for which casual employment services are required in order to fulfill each requirement, receiving, from the data communication device associated with a particular user, a request to search for casual employment opportunities, generating search results in response to the request, the search results representing a selected subset of casual employment requirements, wherein the subset of requirements are selected based upon the geographical location of each selected requirement corresponding to a geographical location pertaining to the particular user, the minimum qualification(s) required to fulfill each selected requirement being satisfied by the qualification(s) of the particular user, and the period of time for which services are required satisfied by the availability of the particular user, causing the data communication device associated with the particular user to display a graphical user interface, the graphical user interface including a listing of the selected subset of casual employment requirements presented as available casual employment opportunities for selection by the particular user.

In an embodiment, a central server is operable to communicate with the plurality of data communication devices associated with individuals or organisations seeking to fulfill casual employment requirements, and with data communication devices associated with users seeking casual employment opportunities.

In an embodiment, the data communication device associated with the particular user is operable to execute a software application that enables communication with the central server, including to enable the display of the graphical user interface on the device.

The geographical location pertaining to each user may be a physical address of each user, a current location of each user (e.g. a current GPS location), or a preferred location or region selected by each user.

In an embodiment, the geographical location pertaining to each requirement is a physical address of a premises at which the casual employment requirement is to be fulfilled.

In an embodiment, the method further includes enabling filtering and/or sorting of the search results based upon a selection by the particular user of filtering and/or sorting criteria relating to one or more factors including the category of casual employment requirement (e.g. fitness/wellbeing, office assistance, etc), geographical location pertaining to each requirement, qualifications required to fulfill each requirement, urgency of each requirement, and period of time (e.g. shift) for which casual employment services are required to fulfill each requirement.

In an embodiment, the graphical user interface further displays an interactive map with particular geographical regions highlighted when the particular geographical regions contain available casual employment opportunities that exceed a minimum threshold, wherein the interface is further operable to enable the user to select a region in the interactive map and thereby be presented with a display of all opportunities within the selected region.

In an embodiment, the method further includes receiving, from the data communication device associated with the particular user, a selection of a particular casual employment requirement from the subset of casual employment requirements, and prompting the individual or organisation seeking to fulfill the particular casual employment requirement to accept or reject the particular user.

In an embodiment, the method further includes enabling registered users to create an employment profile, wherein the employment profile is viewable by the individual or organisation seeking to fulfill the particular casual employment requirement at the time of being prompted to accept or reject the particular user.

In an embodiment, the method further includes providing, upon acceptance of the particular user, a chat and/or video conference facility to each of the particular user and the individual or organisation seeking to fulfill the particular casual employment requirement, thereby allowing the individual or organisation to interview the particular user including to confirm their availability and particular skill set, or provide the particular user with information (e.g. orientation manual, etc) and any other materials required to fulfill the requirement.

In an embodiment, the method further includes enabling, after the particular user has fulfilled the particular casual employment requirement, the individual or organisation for whom the particular user provided a service to confirm completion of the requirement and rank the performance of the particular user, wherein rankings provided to each user are collated and are reflected in the user's employment profile.

In an embodiment, the method further includes collating and storing data relating to the individuals or organisations seeking to fulfill casual employment requirements, the users seeking casual employment opportunities, the casual employment requirements, the profiles of users who have been accepted and rejected in respect of such opportunities including their geographical location and qualifications, any ratings or other feedback provided in respect of registered users, thereby establishing a repository of data that may be utilised for reports (employment charts, etc) generation and analysis (generation of statistics, etc).

In an embodiment, the method further includes training a machine learning model with the collated and stored data, and utilising the machine learning model to generate predictions and recommendations (e.g. recommendations regarding how to structure an employment profile most likely to be accepted by individuals or organisations seeking to fulfill casual employment requirements).

In an embodiment, the method further includes integrating with, or receiving information from, one or more other sources, and based upon the information, providing users with information that will assist to increase their employment opportunities (e.g. specialist services, educational opportunities, incentives, etc).

In a second aspect, the present invention provides a computer-implemented method for fulfilling casual employment requirements, the method including receiving, from data communication devices associated with a plurality of individuals or organisations seeking to fulfill casual employment requirements, details relating to the casual employment requirements including a geographical location pertaining to each requirement, minimum qualification(s) required to fulfill each requirement, and a period of time for which casual employment services are required in order to fulfill each requirement, receiving, from a data communication device associated with one or more users seeking casual employment opportunities, details relating to the one or more users including a geographical location pertaining to each user, qualification(s) associated with each user, and availability associated with each user, receiving, from the data communication device associated with a particular individual or organisation, a request to search for users seeking casual employment opportunities, generating search results in response to the request, the search results representing a selected subset of users seeking casual employment opportunities, wherein the subset of users are selected based upon the geographical location of each selected user corresponding to a geographical location pertaining to the particular requirement, the minimum qualification(s) required to fulfill the requirement being satisfied by the qualification(s) associated with each selected user, and the period of time for which services are required being satisfied by the availability of each selected user, causing the data communication device associated with the particular individual or organisation to display a graphical user interface, the graphical user interface including a listing of the selected subset of users seeking casual employment opportunities presented as available users seeking casual employment for selection by the particular individual or organisation.

In a third aspect, the present invention provides a system for fulfilling casual employment requirements, the system including one or more processors operable to receive, from a data communication device associated with one or more users seeking casual employment opportunities, details relating to the one or more users including a geographical location pertaining to each user, qualification(s) associated with each user, and availability associated with each user, receive, from data communication devices associated with a plurality of individuals or organisations seeking to fulfill casual employment requirements, details relating to the casual employment requirements including a geographical location pertaining to each requirement, minimum qualification(s) required to fulfill each requirement, and a period of time for which casual employment services are required in order to fulfill each requirement, receive, from the data communication device associated with a particular user, a request to search for casual employment opportunities, generate search results in response to the request, the search results representing a selected subset of casual employment requirements, wherein the subset of requirements are selected based upon the geographical location of each selected requirement corresponding to a geographical location pertaining to the particular user, the minimum qualification(s) required to fulfill each selected requirement being satisfied by the qualification(s) associated with the particular user, and the period of time for which services are required being satisfied by the availability of the particular user, cause the data communication device associated with the particular user to display a graphical user interface, the graphical user interface including a listing of the selected subset of casual employment requirements presented as available casual employment opportunities for selection by the particular user.

In a fourth aspect, the present invention provides a computer-readable medium having a plurality of instructions executable by one or more processors to receive, from a data communication device associated with one or more users seeking casual employment opportunities, details relating to the one or more users including a geographical location pertaining to each user, qualification(s) associated with each user, and availability associated with each user, receive, from data communication devices associated with a plurality of individuals or organisations seeking to fulfill casual employment requirements, details relating to the casual employment requirements including a geographical location pertaining to each requirement, minimum qualification(s) required to fulfill each requirement, and a period of time for which casual employment services are required in order to fulfill each requirement, receive, from the data communication device associated with a particular user, a request to search for casual employment opportunities, generate search results in response to the request, the search results representing a selected subset of casual employment requirements, wherein the subset of requirements are selected based upon the geographical location of each selected requirement corresponding to a geographical location pertaining to the particular user, the minimum qualification(s) required to fulfill each selected requirement being satisfied by the qualification(s) associated with the particular user, and the period of time for which services are required being satisfied by the availability of the particular user, cause the data communication device associated with the particular user to display a graphical user interface, the graphical user interface including a listing of the selected subset of casual employment requirements presented as available casual employment opportunities for selection by the particular user.

BRIEF DESCRIPTION OF THE DRAWINGS

Features of the present disclosure are illustrated by way of example and not limited in the following Figure(s), in which like numerals indicate like elements, in which.

DETAILED DESCRIPTION OF EMBODIMENT(S) OF THE INVENTION

For simplicity and illustrative purposes, the present disclosure is described by referring to embodiment(s) thereof. In the following description, numerous specific details are set forth in order to provide a thorough understanding of the disclosure. It will be readily apparent, however, that the current disclosure may be practised without limitation to the specific details. In other instances, some methods and structures have not been described in detail to avoid obscuring the disclosure.

Figure 1:
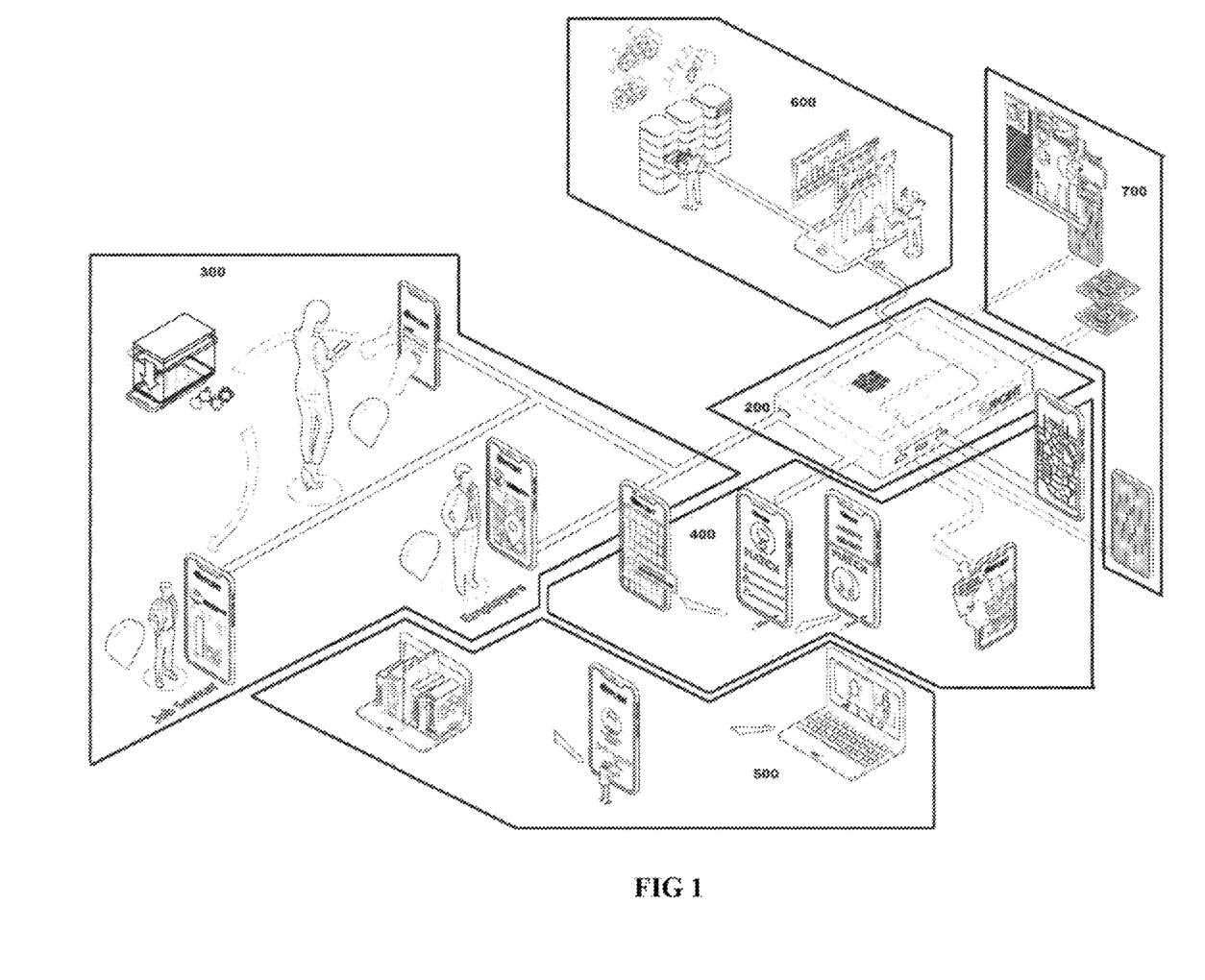
FIG. 1 provides an overview of a system according to an embodiment of the images showing, in particular, the interaction between various system components.

According to an embodiment, the present invention involves a system and method for fulfilling casual employment requirements as depicted in FIG. 1. The system and method provide a platform that hosts a computer-executable software application (40, 70), wherein the application (40, 70) is accessible by a plurality of users. For example, job seekers (30) may access software application (40), and employers (60) may access an employer application (70).

The platform enables the generation of employment opportunity search results (250) in response to search requests by a particular job seeker (30), the search results (250) reflecting a subset of all of the available casual employment opportunities (also referred to herein as causal employment requirements). The subset of results is selected based upon the geographical location of each selected requirement corresponding to a geographical location pertaining to the job seeker (30), the minimum qualifications required to fulfil each selected requirement being satisfied by the qualifications of the particular job seeker (30), and a period of time for which services are required being satisfied by the availability of the particular job seeker (30).

In particular, the central server (20) maintains one or more processors and/or databases for performing functions, including receiving data from job seekers (30) and employers (60) through their respective software applications (or by other means as described in greater detail below), wherein the data received relates to a geographical location of each job seeker (30) and the casual employment requirements associated with each employer (60), qualifications associated with the job seeker (30) and the minimum qualification requirements associated with each casual employment requirement, and availability associated with each job seeker (30) and a period of time for which each casual employment requirement requires in order for the requirement to be fulfilled. When such data is submitted by each job seeker (30) and employer (60), they may utilise a data communication device (50) operable to connect with the server (20) across a data communications network, and the server (20) operable to store the data in a database (100). The server (20) may then retrieve the data as required, and perform analysis (e.g. using data analysis functionality (104)) to generate the relevant search results (250) in response to search requests by job seekers (30). Accordingly, each job seeker (30) is assisted to locate casual employment opportunities by being presented with available opportunities for selection wherein the opportunities satisfy certain geographical, qualification and availability criteria of the job seeker (30).

The platform may also provide similar results based upon a search request submitted by an employer (60) searching for job seekers (30) available to fulfill particular casual employment requirements. In this embodiment, the server (20) may perform analysis (e.g. using data analysis functionality (104)) to generate relevant search results (250) in response to search requests by employers (60). Accordingly, each employer (60) is assisted to locate casual employment candidates by being presented with available candidates for selection wherein the candidates satisfy certain geographical, qualification and availability criteria of the employer (60). Whilst the main embodiment illustrated and described herein relates to addressing a search request received from a job seeker (30), it is to be understood that similar steps and principles apply with respect to addressing search requests received from employers (60).

The person skilled in the relevant field of technology will appreciate that the platform provides a technical solution to various problems including the difficulty associated with software platforms providing employers with the ability to fill positions at short notice in addition to providing job seekers with the ability to seek quality casual employment at short notice. The platform also provides a technical solution to a technical problem regarding wastage of computing and memory resources during the process of searching for and engaging replacement staff members (from the perspective of an employer) and during searching for casual employment opportunities (from the perspective of job seekers) using conventional computing systems and methods.

FIG. 1 is divided into segments which are further expanded in subsequent FIGS. 2 to 7. In particular, segment 200 of FIG. 1 shows the server component (20) with which a software application (40) operating on data communication devices (50) of job seekers (30) are configured to communicate. The server component (20) is also operable to communicate with data communication devices (50) associated with employers (60), thereby providing employers (60) with access to their specific version of the software application, (i.e. software application (70)). It will be apparent to the person skilled in the relevant field of technology that the software applications (40/70) may be mobile applications or web applications, and similarly, the data communication devices (50) utilised by the job seekers (30) and the employers (60) may be mobile devices or computer devices. Examples of mobile devices include mobile phones or tablets, and examples of computer devices include laptops or personal computers.

Figure 2:
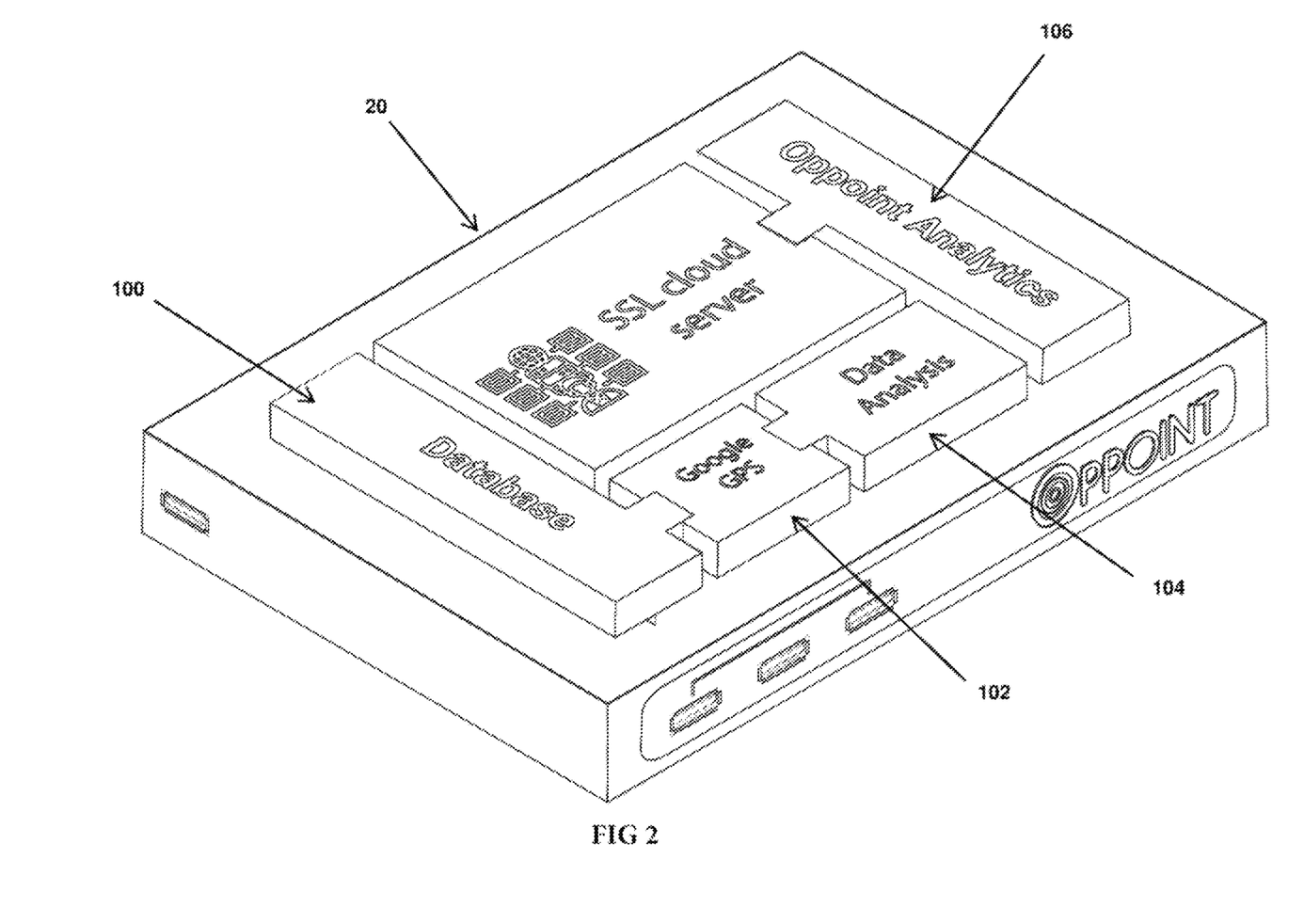
FIG. 2 illustrates an exemplary diagram illustrated with the server component associated with the system illustrated in FIG. 1.

The server component (20) is additionally detailed in FIG. 2 and the skilled person will appreciate that the steps described herein, as executable by the devices (50), may be facilitated by the software applications (40/70) operating on each device (50).

As an alternative, or in addition to, steps described herein as performed by the server (20) the steps described may be performed by one or more processors associated with the user devices (50) (i.e. in a distributed architecture). Different arrangements are possible in this regard, but according to a particular implementation of the present invention, the server (20) is programmed to provide all of the functions described herein where they cannot be provided locally on the user devices (50).

Figure 3:
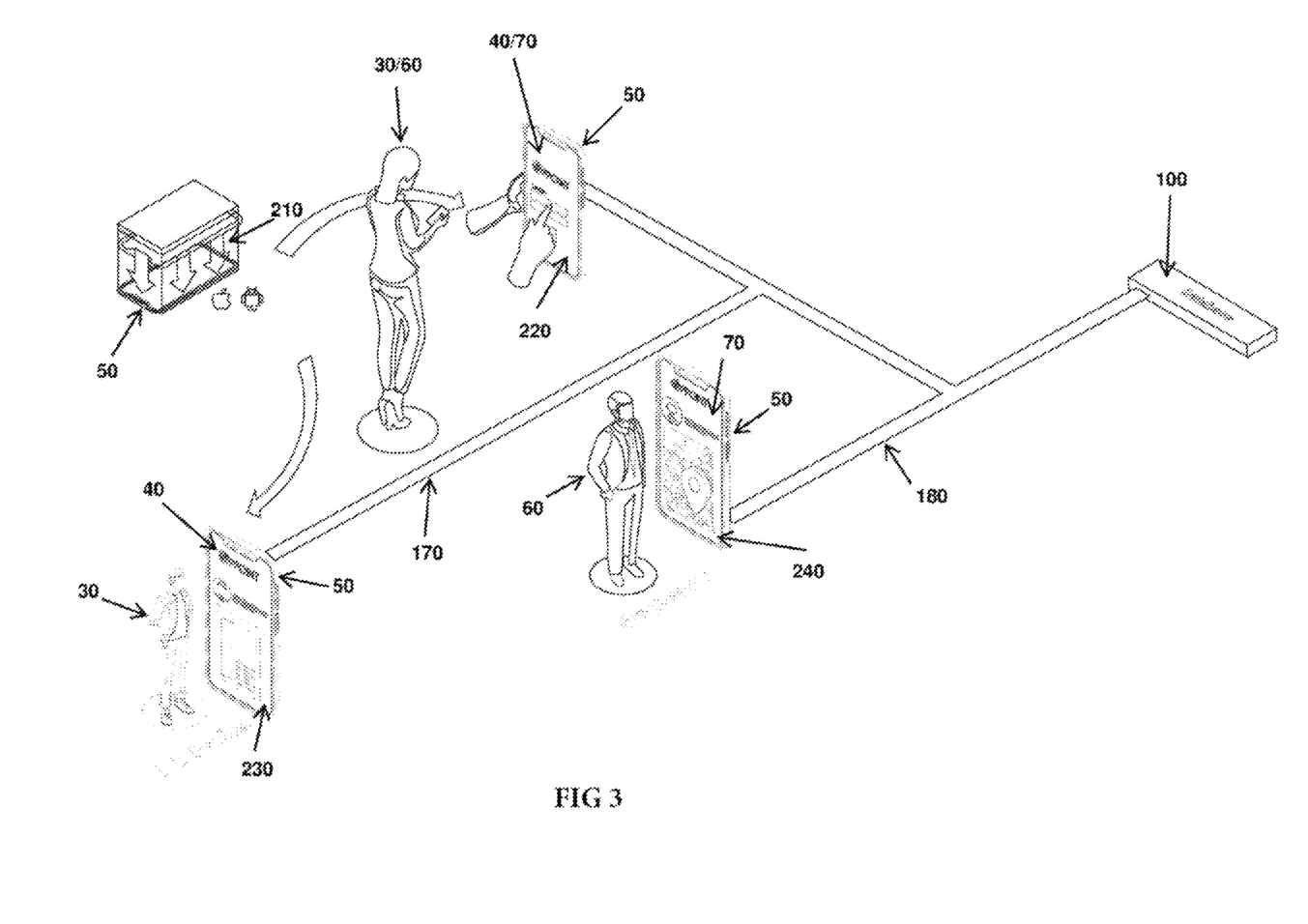
FIG. 3 illustrates an exemplary flow diagram of a process that enables a job seeker/employer to download and install the software application, and subsequently access, or register to use, the software application, for interaction with the system illustrated in FIG. 1.

Segment 300 of FIG. 1 shows a user (30/60) downloading and installing the relevant application (40/70) to enable each of the job seeker (30) and employer (60) to access the full functionality of their respective applications (40/70), including to create profiles (e.g. an employment profile on behalf of the job seeker (30)) and to update relevant information, as further detailed in FIG. 3. Segment 400 of FIG. 1 shows how the job seeker (30) may utilise the application (40) to search for, and select, casual employment opportunities, and allow employers (60) to approve candidates with respect to fulfilling casual employment requirements associated with the employer (60), as further detailed in FIG. 4. Segment 500 of FIG. 1 illustrates additional functionality of each of the software applications (40) and (70), including the provision of additional material (290) to educate the job seeker (30) with respect to a particular casual employment requirement, the ability to rank job seekers (30), as well as the ability for the employer (60) and job seeker (30) to engage by way of interview, chat, etc, as detailed in FIG. 5. Segment 600 of FIG. 1 illustrates how the server (20) may interface with one or more third party hardware systems for the purpose of retrieving and transmitting relevant additional data (330), as detailed in FIG. 6. Finally, segment 700 of FIG. 1 illustrates the collation and storage of data (340) over time for the purpose of training machine learning hardware (350) which may then be used to generate predictions and recommendations and provide additional useful outputs, as detailed in FIG. 7.

As mentioned above, FIG. 2 shows in greater detail Segment 200 of FIG. 1, and in particular, FIG. 2 shows the server component (20) which may include infrastructure upon which the platform of the present invention operates. The infrastructure may be local or cloud-based. The central server (20) may operate one or more processors and maintain one or more databases to enable the following functionality and/or storage:

User (job seeker and employer) database (100) storing details relating to each registered jobseeker (30) and employer (60), (e.g. names, addresses, contact details, etc), as well as any additional data which may be relevant for identifying each user. Where possible these details may be verified using identification verification services. Database (100) may further store details submitted by each user (30/60), as well as any data retrieved from third-party systems (320), and the data from these multiple sources may be suitably indexed to facilitate retrieval thereof for analytical purposes. Certain outputs may also be stored in database (100), including, for example, data relating to generated search results, approvals by employers with respect to job seeker applications, and ratings and additional feedback data;

Geographical location database (102) storing details relating to received and captured Global Positioning System (GPS) locations associated with job seekers (30) and employers (60). In particular, the geographical location pertaining to each job seeker may be a physical address, a current location (e.g. a current GPS location), or a preferred location or region selected by the job seeker (30). Likewise, the geographical location pertaining to the employer (60) may be the location associated with a particular casual employment requirement, (e.g. a physical address of a premises at which the casual employment requirement needs to be fulfilled);

Data analysis functionality (104) for processing a search request received from a job seeker (30) for casual employment opportunities, including the received/captured data relating to geographical location, qualifications, job seeker availability, and time for which services are required to satisfy the employment requirement, in order to generate search results reflecting a selected subset of casual employment requirements (e.g. based upon the geographical location, minimum qualifications, and time period for which services are required being satisfied by the particular job seeker (30) from whom a search request has been received);

Machine learning functionality (106) which may utilise machine learning hardware (350) trained to generate predictions and recommendations and additional useful outputs as described below, the hardware (350) utilising a machine learning model that may be trained with data collected and stored with respect to various interactions with the system illustrated in FIG. 1.

FIGS. 2 and 3 also depict server (20) configured to enable communication (170) with the job seeker devices (50) and, in particular, with the software application (40) operating on each job seeker device (50). FIGS. 2 and 3 also show how server (20) is configured to communicate (180) with the employer devices (50) and, in particular, with the software application (70) operating on each employer device (50). It will also be appreciated that the server (20) is capable of communications (185) with third-party hardware systems (320) (such as the systems illustrated in FIG. 6). Such communications may occur across the internet or any similar data communications network.

FIG. 3 shows in greater details Segment 300 of FIG. 1 and, in particular, the steps associated with a user (30/60) installing (210) the software application (40/70) on their respective devices (50), and subsequently accessing a user login and registration interface (220) associated with the applications (40/70). Such access may be granted after the user (30/60) has installed the application (40/70) which may be achieved by downloading the application (40/70) from an application store. Each job seeker (30) and employer (60) may create an account using the application (40/70), and the account information may be stored in the database (100). As described above, the database (100) may capture information sufficient to enable each user to be correctly identified.

Once the application (40) has been accessed by a job seeker (30), the job seeker (30) may be presented with an interface that allows the job seeker (30) to create and maintain an employment profile that will subsequently enable employers (60) to view information about the job seeker (30), and further allow job seekers (30) to manage their profiles. The profiles may contain basic information about the job seeker (30) including name, age, location, qualifications etc, and over time, the job seekers profile may include additional information such as employment experience, ranking, etc.

FIG. 3 illustrates two example interfaces, namely interface (230) accessible through job seeker application (40) which is an example profile creation interface which enables the job seeker (30) to upload relevant data relating to their geographical location (physical, current or preferred), their qualifications, as well as their availability for casual employment. Similarly, FIG. 3 illustrates an example interface (240) accessible through employer application (70) which enables employers (60) to upload data relating to their particular casual employment requirements including the geographical location (e.g. physical address of a premises) at which the casual employment requirement is to be fulfilled, minimum qualifications required to fulfil each requirement, and a period of time for which casual employment services are required.

Figure 4:
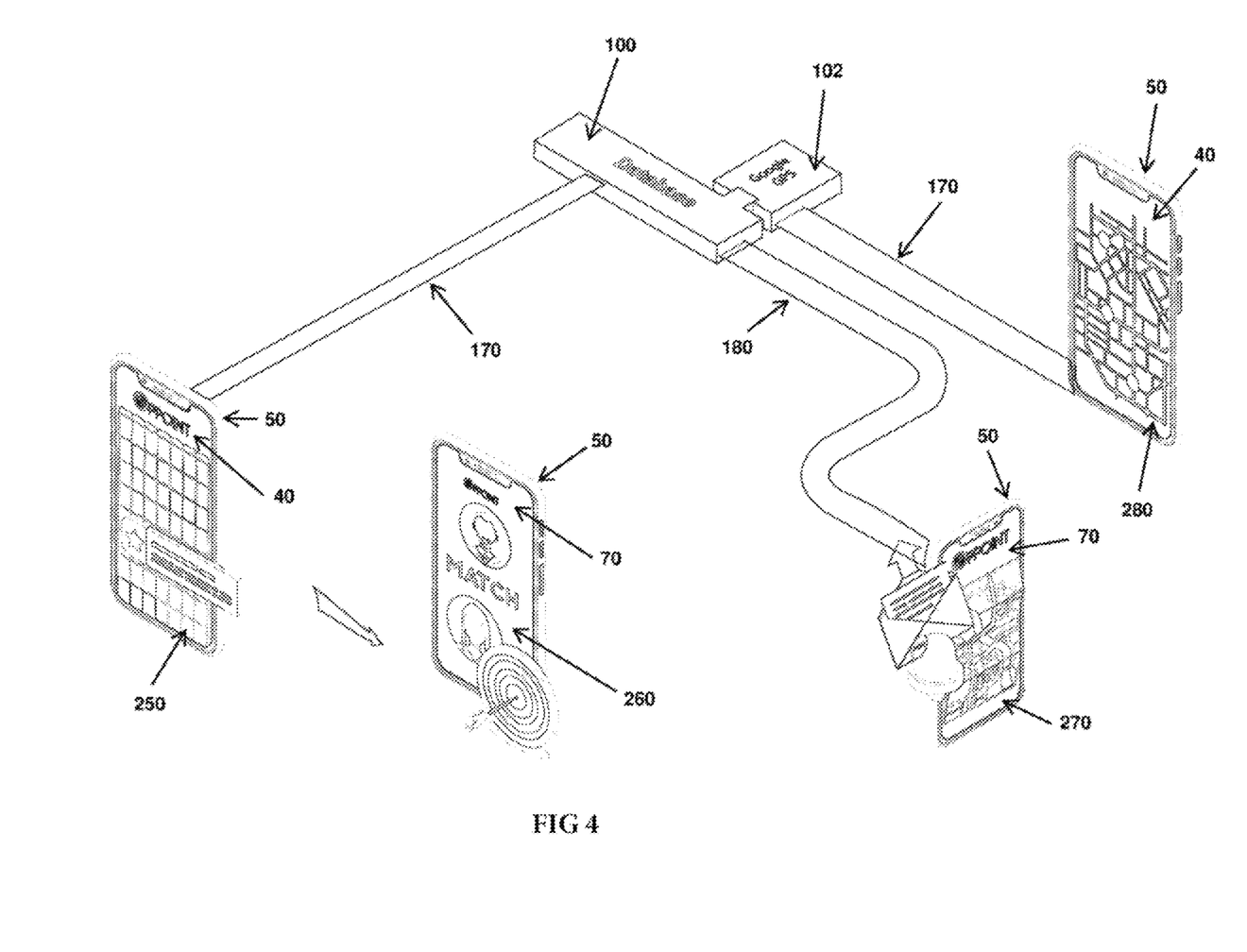
FIG. 4 illustrates an exemplary flow diagram of a process that enables a job seeker to search for employment opportunities, for an employer to accept a job seeker with respect to particular casual employment requirement(s), and for the job keeper to be provide relevant details with respect to the casual employment requirement(s)

FIG. 4 shows in greater detail Segment 400 of FIG. 1 and, in particular, example interfaces which may be generated based upon the receipt of a search request by a job seeker (30), namely, a request to search for casual employment opportunities. For example, interface (250) provides a listing of search results viewable by a job seeker (30), wherein the search results are focused to correspond with the particular needs of the job seeker (30). In this regard, only those casual employment opportunities which satisfy the particular job seeker's criteria with respect to geographical location, qualifications, and availability, are automatically populated in the search results (250) and displayed to the job seeker (30).

Such search results may also be filtered and/or sorted according to a selection by the job seeker (30), whereby the filtering and/or sorting criteria may relate to one or more factors f including category of casual employment requirement (e.g. fitness/wellbeing, office assistance, etc), geographical location pertaining to each requirement, qualifications required to fulfil each requirement, urgency of each requirement, and period of time (e.g. shift) for which casual employment services are required to fulfil each requirement. In other words, whilst the interface (250) may provide an automatic selection of casual employment opportunities, the list may be further filtered and/or sorted according to the job seeker's specific needs at the time of conducting a search.

The job seeker (30) may also be assisted by the application (40), (e.g. by being provided an interactive map with particular geographical regions in which casual employment opportunities that exceed a minimum threshold are highlighted). Such an interface may be further operable to enable the job seeker (30) to select a region in the interactive map and thereby be presented with a display of all opportunities within the selected region.

Interface (260) of FIG. 4 is an example interface that may be generated once the job seeker (30) selects a particular casual employment requirement from the listed opportunities. By selecting a particular employment opportunity, additional detail may be presented to the job seeker (30) in relation to the specific requirement(s) of the selected opportunity. Once the job seeker (30) confirms their interest in a particular casual employment requirement, the employer (60) associated with the particular requirement may be notified (e.g. by push notification, email or text message), and may be presented with interface (260) indicating that there is interest in the particular listed casual employment requirement (i.e. that a matching job seeker (30) has indicated their interested in fulfilling the requirement). In this regard, interface (260) may also prompt the employer (60) to view additional detail relating to the job seeker (30) and to accept or reject the request from job seeker (30) to fulfil the employer's particular casual employment requirement(s).

FIG. 4 also shows an exemplary interface (270) demonstrating how, upon approval of a particular job seeker (30), a notification may be packaged and transmitted to the job seeker (30) in relation to the acceptance of the job seeker (30) by the employer (60) in respect of the particular opportunity. The information that is packaged and transmitted to the relevant job seeker (30) may include the same or additional information as compared with the information that was previously viewable by the job seeker (30) with respect to the particular casual employment requirement. For example, the detail that is packaged and transmitted, as shown in interface (270), may include one or more links (e.g. to an interactive map or to additional relevant materials (290) which the job seeker (30) may require to fulfil the requirement, as shown in FIG. 5), as well as information relating to the particular shift(s) that require fulfilment.

FIG. 4 shows an additional interface (280) that may be viewable upon the job seeker's device using software application (40) which displays an interactive map to assist the job seeker (30) to travel from their location to the casual employment location, which map may be generated based upon the selection of a link provided by the employer using interface (270).

Figure 5:
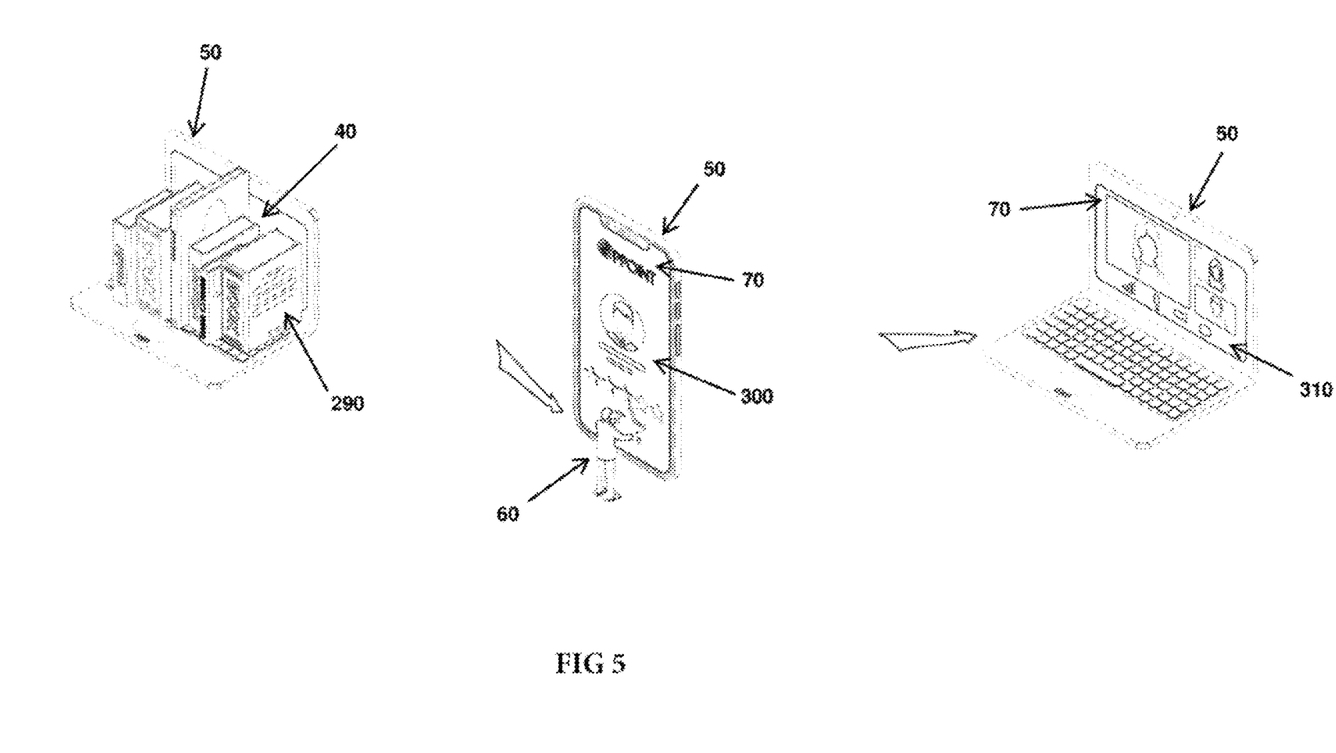
FIG. 5 illustrates an exemplary flow diagram of a process that enables the job seeker to be provided with relevant materials to facilitate the casual employment requirement, the employer to review ranking information and to provide their own ranking upon completion of the employment requirement, and chat/interview functionality between the job seeker and employer.

FIG. 5 shows in greater detail Segment 500 of FIG. 1, and, in particular, various additional interfaces which may be provided to each of the job seeker (30) and employer (60) on their respective devices (50), subsequent to acceptance of a particular job seeker (30) for a particular casual employment requirement. As mentioned above, interface (290) provides additional material, including instruction manuals and timetables, which the job seeker (30) may require in order to fulfil their obligations during the particular shift(s). Interface (300) enables employers to view additional information relating to the job seeker (30) including a ranking of the job seeker (30) based upon previous performance on behalf of other employers (60), which interface (300) may further enable the employer (60) to rank the job seeker (30) once the particular casual employment requirement has been fulfilled.

FIG. 5 also illustrates an exemplary interface (310) which enables communications between the employer (60) and the approved job seeker (30), including chat or video conferencing functionality, thereby enabling the job seeker (30) to be interviewed, or for general communication between the employer (60) and job seeker (30) to be facilitated in the lead up to the job seeker (30) commencing their casual employment position. Interfaces (290) and/or (310) may also be utilised to exchange additional documentation, including documents such as casual employment contracts and other legal documentation that may be required to be signed before the job seeker (30) commences their shift.

Figure 6:
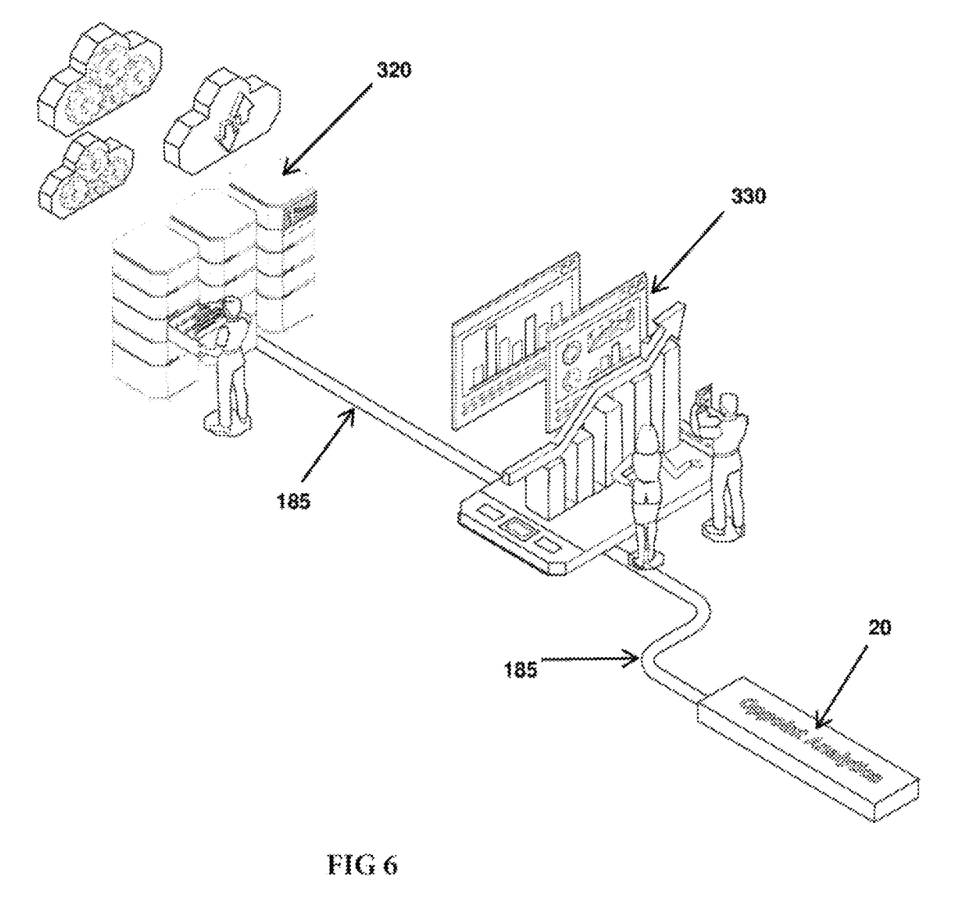
FIG. 6 illustrates an exemplary flow diagram of a process that enables third party hardware systems to be interfaced with and for data to be retrieved from/transmitted to the third party hardware systems.

FIG. 6 shows in greater detail Segment 600 of FIG. 1, and, in particular, the possible integration with one or more third party hardware systems (320) to enable data (330) to be received from and transmitted to the hardware systems (320). For example, useful information may be retrieved from such systems including information relating to specialist services, educational opportunities and incentives for job seekers (30). According to another embodiment, the hardware systems (320) may be associated with one or more private or government employment agencies and may therefore provide data relating to job seekers (30), and by doing so, may enable employers (60) to initiate contact with such job seekers who may not have yet registered to use the software application (40). Alternatively, the system may be configured to automatically communicate with job seekers retrieved from such systems (e.g. by sending an email communication) and inviting the job seeker (30) to register to use the software application (40) to locate and fulfil casual employment opportunities. Data may also be transmitted to such systems, including for the purpose of providing statistical information back to the government employment agency or any other government authority to enable analysis of such data.

Figure 7:
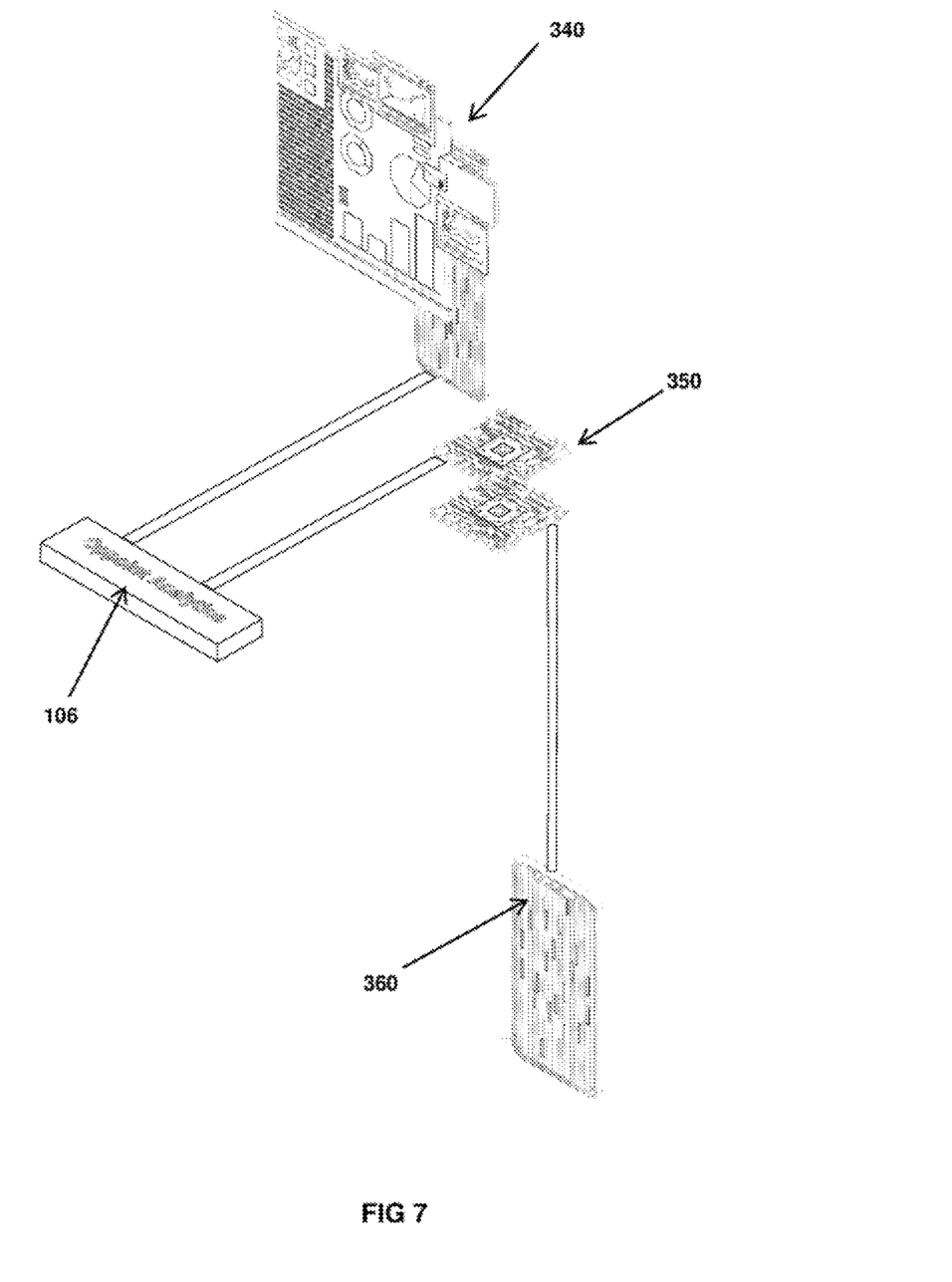
FIG. 7 illustrates an exemplary flow diagram of a process that enables data to be gathered over time to train machine learning hardware, and to provide relevant information to multiple individuals/entities.

FIG. 7 shows in greater detail Segment 700 of FIG. 1 and, in particular, the collation and storage of data received and/or generated by the server (20). For example, such data (340) may include data relating to employers (60) (i.e. individuals or organisations seeking to fulfil casual employment requirements), job seekers (30) seeking casual employment opportunities, the casual employment requirements, the profiles of job seekers (30) who have historically been accepted and rejected in respect of such opportunities (including their geographical locations and qualifications), or any ranking or ratings or other feedback provided in respect of registered users. The collation and storage of such data may establish a repository of data that may be utilised for report generation (e.g. employment charts and the like) and further analysis (generation of statistics, etc).

In the example shown in FIG. 7, the data (340) is utilised to train a machine learning model (associated with machine learning hardware (350)). The skilled addressee will appreciate that by utilising the machine learning model in this manner, the hardware (350) may generate predictions and recommendations relevant to both the job seekers (30) and employers (60). For example, job seekers (30) may be provided with recommendations regarding how to structure an employment profile most likely to be accepted by employers (60) seeking to fulfil casual employment requirements. Accordingly, complex streams of employment data may be retrieved and stored, and detailed reports, recommendations and predictions may be generated based upon such data. Over time, the availability of large amounts of data will enable advice to be generated regarding future growth and job opportunities. An example interface (360) displaying the output of the machine learning model is also shown in FIG. 7.

As used herein, the term "server", "system", "computer", "computing system" or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms.

The one or more processors as described herein are configured to execute a set of instructions that are stored in one or more data storage units or elements (such as one or more memories), in order to process data. For example, the one or more processors may include or be coupled to one or more memories. The data storage units may also store data or other information as desired or needed. The data storage units may be in the form of an information source or a physical memory element within a processing machine.

The set of instructions may include various commands that instruct the one or more processors to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units. It is to be understood that the processing or control units may represent circuits, circuitry, or portions thereof that may be implemented as hardware with associated instructions (e.g. software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like.

Optionally, the one or more processors may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in the figures or a described method.

Throughout this specification and claims which follow, unless the context requires otherwise, the word "comprise", and variations such as "comprises" and "comprising", will be understood to mean the inclusion of a stated feature or step, or group of features or steps, but not the exclusion of any other feature or step, or group of features or steps.

The reference to any prior art in this specification is not, and should not be taken as, an acknowledgement or any suggestion that the prior art forms part of the common general knowledge.

The claims defining the invention are as follows:

1. A computer-implemented method for fulfilling casual employment requirements, the method comprising:
   receiving, from data communication device(s) associated with one or more users seeking casual employment opportunities, details relating to the one or more users comprising:
      a geographical location pertaining to each user,
      qualification(s) associated with each user, and
      availability associated with each user;
   receiving, from data communication devices associated with a plurality of individuals or organisations seeking to fulfill casual employment requirements, details relating to the casual employment requirements comprising:
      a geographical location pertaining to each requirement,
      minimum qualification(s) required to fulfill each requirement, and
      a period of time for which casual employment services are required in order to fulfill each requirement;
   receiving, from the data communication device associated with a particular user, a request to search for casual employment opportunities;
   generating search results in response to the request, the search results representing a selected subset of casual employment requirements, wherein the subset of requirements are selected based upon:
      the geographical location of each selected requirement corresponding to a geographical location pertaining to the particular user,
      the minimum qualification(s) required to fulfill each selected requirement being satisfied by the qualification(s) of the particular user, and
      the period of time for which services are required satisfied by the availability of the particular user;
   causing the data communication device associated with the particular user to display a graphical user interface, the graphical user interface comprising a listing of the selected subset of casual employment requirements presented as available casual employment opportunities for selection by the particular user, wherein the graphical user interface further displays an interactive map with particular geographical regions highlighted when the particular geographical regions contain available casual employment opportunities that exceed a minimum threshold, wherein the interface is further operable to enable the user to select a region in the interactive map and thereby be presented with a display of all opportunities within the selected region.

2. The computer-implemented method of claim 1, further comprising enabling filtering and/or sorting of the search results based upon a selection by the particular user of filtering and/or sorting criteria relating to one or more factors comprising: the category of casual employment requirement, the geographical location pertaining to each requirement, the qualifications required to fulfill each requirement, an urgency of each requirement, and the period of time for which casual employment services are required to fulfill each requirement.

3. The computer-implemented method of claim 1, further comprising enabling the users to create an employment profile, wherein the employment profile is viewable by the individual or organisation seeking to fulfill the particular casual employment requirement.

4. The computer-implemented method of claim 1, further comprising enabling, after the particular user has fulfilled the particular casual employment requirement for a particular individual or organisation, the individual or organisation to confirm completion of the requirement and rank the performance of the particular user, wherein rankings provided to each user are collated and are reflected in the user's employment profile.

5. The computer-implemented method of claim 1, further comprising collating and storing data relating to the individuals or organisations seeking to fulfill casual employment requirements, the users seeking casual employment opportunities, the casual employment requirements, the profiles of users who have been accepted and rejected in respect of such opportunities comprising their geographical location and qualifications, and any ratings or other feedback provided in respect of registered users, thereby establishing a repository of data to be utilised for report generation and analysis of the data.

6. The computer-implemented method of claim 5, further comprising training a machine learning model with the collated and stored data, and utilising the machine learning model to generate predictions and recommendations for users for structuring an employment profile to increase the prospect for acceptance by individuals or organisations seeking to fulfill casual employment requirements.

7. The computer-implemented method of claim 1, further comprising integrating with, or receiving information from, one or more other sources, and based upon the information, providing users with information that will assist to increase their employment opportunities.

8. A system for fulfilling casual employment requirements, the system comprising one or more processors operable to:
receive, from data communication device(s) associated with one or more users seeking casual employment opportunities, details relating to the one or more users comprising:
a geographical location pertaining to each user,
qualification(s) associated with each user, and
availability associated with each user;
receive, from data communication devices associated with a plurality of individuals or organisations seeking to fulfill casual employment requirements, details relating to the casual employment requirements comprising:
a geographical location pertaining to each requirement,
minimum qualification(s) required to fulfill each requirement, and
a period of time for which casual employment services are required in order to fulfill each requirement;
receive, from the data communication device associated with a particular user, a request to search for casual employment opportunities;
generate search results in response to the request, the search results representing a selected subset of casual employment requirements, wherein the subset of requirements are selected based upon:
the geographical location of each selected requirement corresponding to a geographical location pertaining to the particular user,
the minimum qualification(s) required to fulfill each selected requirement being satisfied by the qualification(s) of the particular user, and
the period of time for which services are required satisfied by the availability of the particular user;
cause the data communication device associated with the particular user to display a graphical user interface, the graphical user interface comprising a listing of the selected subset of casual employment requirements presented as available casual employment opportunities for selection by the particular user, wherein the graphical user interface further displays an interactive map with particular geographical regions highlighted when the particular geographical regions contain available casual employment opportunities that exceed a minimum threshold, wherein the interface is further operable to enable the user to select a region in the interactive map and thereby be presented with a display of all opportunities within the selected region.

9. The computer-implemented system of claim 8, wherein the one or more processors are further configured to enable the geographical location pertaining to each user to be selected from any one of a physical address of the user, a current location of the user, or a preferred location or region specified by the user.

10. The computer-implemented system of claim 8, wherein the one or more processors are further configured to enable filtering and/or sorting of the search results based upon a selection by the particular user of one or more factors comprising any one or more of: the category of casual employment requirement, the geographical location pertaining to each requirement, the qualifications required to fulfill each requirement, an urgency of each requirement, and the period of time for which casual employment services are required to fulfill each requirement.

11. The computer-implemented system of claim 8, wherein the one or more processors are further configured to enable each user to create an employment profile, wherein the employment profile is viewable by the individual or organisation seeking to fulfill the particular casual employment requirement.

12. The computer-implemented system of claim 8, wherein the one or more processors are further configured to receive, from the data communication device associated with the particular user, a selection of a particular casual employment requirement from the subset of casual employment requirements, and prompting the individual or organisation seeking to fulfill the particular casual employment requirement to accept or reject the particular user.

13. The computer-implemented system of claim 12, wherein the one or more processors are further configured to provide, upon acceptance of the particular user by the individual or organisation seeking to fulfill the particular casual employment requirement, a chat and/or video conference facility to each of the accepted particular user and the individual or organisation.

14. The computer-implemented system of claim 8, wherein the one or more processors are further configured to enable, after the particular user has fulfilled the particular casual employment requirement for a particular individual or organisation, the individual or organisation to confirm completion of the requirement and rank the performance of the particular user, wherein rankings provided to each user are collated and reflected in the user's employment profile.

15. The computer-implemented system of claim 8, wherein the one or more processors are further configured to enable collating and storing of data relating to the individuals or organisations seeking to fulfill casual employment requirements, the users seeking casual employment opportunities, the casual employment requirements, the profiles of users who have been accepted and rejected in respect of such opportunities comprising their geographical location and qualifications and any ratings or other feedback provided in respect of registered users, thereby establishing a repository of data to be utilised for report generation and analysis of the data.

16. The computer-implemented system of claim 15, wherein the one or more processors are further configured to train a machine learning model with the collated and stored data, and utilising the machine learning model to generate predictions and recommendations for users for structuring an employment profile to increase the prospect for acceptance by individuals or organisations seeking to fulfill casual employment requirements.

17. The computer-implemented system of claim 8, wherein the one or more processors are further configured to integrate with, or receive information from, one or more other sources, and based upon the information, provide users with information that will assist to increase their employment opportunities.

18. A non-transitory computer-readable medium having a plurality of instructions executable by one or more processors to:
receive, from a data communication device associated with one or more users seeking casual employment opportunities details relating to the one or more users comprising:
a geographical location pertaining to each user;
qualification(s) associated with each user; and
availability associated with each user;
receive, from data communication devices associated with a plurality of individuals or organisations seeking to fulfill casual employment requirements, details relating to the casual employment requirements comprising:
a geographical location pertaining to each requirement;
minimum qualification(s) required to fulfill each requirement;
and a period of time for which casual employment services are required in order to fulfill each requirement,
receive, from the data communication device associated with a particular user, a request to search for casual employment opportunities;
generate search results in response to the request, the search results representing a selected subset of casual employment requirements, wherein the subset of requirements are selected based upon:
the geographical location of each selected requirement corresponding to a geographical location pertaining to the particular user;
the minimum qualification(s) required to fulfill each selected requirement being satisfied by the qualification(s) associated with the particular user; and
the period of time for which services are required being satisfied by the availability of the particular user,
cause the data communication device associated with the particular user to display a graphical user interface, the graphical user interface comprising a listing of the selected subset of casual employment requirements presented as available casual employment opportunities for selection by the particular user, wherein the graphical user interface further displays an interactive map with particular geographical regions highlighted when the particular geographical regions contain available casual employment opportunities that exceed a minimum threshold, wherein the interface is further operable to enable the user to select a region in the interactive map and thereby be presented with a display of all opportunities within the selected region.

* * * * *